2,921,870

TREATMENT OF THERMOPLASTIC ARTICLES WITH ORGANO-HALOSILANES AND THE RESULTING PRODUCTS

Bernard Baum, Plainfield, and James Harding, Bound Brook, N.J., assignors to Union Carbide Corporation, a corporation of New York No Drawing. Application April 23, 1957
Serial No. 654,473

16 Claims. (Cl. 117—138.8)

This invention relates to the treatment of thermoplastic articles to render them heat-resistant, stain-resistant and scratch-resistant, and to the articles resulting from such treatment.

Articles made with thermoplastic resins have been used for many and varied purposes, for example, in the form of fibrous, molded, extruded or cast water-repellent products. Unfortunately, many of such products, of which the polymers of ethylene are illustrative, are easily marred, abraded or cut. They are easily stained by fruit or vegetable juices. They also are lacking in heat resistance, and when exposed to elevated temperatures their surfaces become wrinkled and uneven. As a consequence, these articles may lose their attractive appearance or may even be rendered unfit for further use.

It has already been proposed to treat certain products, for example, solid bodies normally water non-repellent, with the vapors of organo silicon halides so as to render them water repellent. While such treatment has been found to be effective in rendering certain materials water repellant, it does not, when applied, for example, to ethylene polymers, improve them as regards their resistance to cutting, marring or scratching, staining, or distortion when exposed to elevated temperatures. All prior efforts, of which we are aware, involving the treatment of thermoplastic bodies with organohalosilanes expressly teach that the treatment should be such as to leave the appearance of the bodies substantially unchanged, whatever coating being imparted to the treated article being invisible or colorless.

In accordance with the present invention we have found that if thermoplastic bodies are treated with organohalosilanes so as to cause penetration thereof to the extent of at least 3 mils and to impart a definite opacity thereto, a marked increase results in the stain-resistance, the heat-resistance and scratch-resistance of such bodies. Such a result was quite surprising as it would have been expected that any treatment drastic enough to cause opacity would cause adverse surface and other effects to be exhibited by the treated articles.

In general, the process of this invention is conducted by bringing thermoplastic articles into contact with an organohalosilane at an elevated temperature for a sufficient period as hereinafter-defined, and subjecting the so-treated articles to a controlled slow hydrolysis of the organohalosilane, said period being such that the so-treated articles, following the aforesaid slow hydrolysis, have an opacity, without surface brittleness, at least equivalent to the opacity obtained by treating a 125 mil thick compression molded polyethylene section with vinyl-trichlorosilane vapors for 2 minutes at 90° C. and then subjecting the so-treated polyethylene to a controlled slow hydrolysis.

The products obtained in accordance with this invention are heat-, stain- and scratch-resistant; show penetration of silicon material below their surfaces; and exhibit a substantial weight increase due to the herein-disclosed treatment. Depending on the time and temperature of treatment, for example, polyethylene articles made in accordance with this invention are resistant to distortion at temperatures up to about 200° C., as compared to temperature limits of about 115° C., for corresponding untreated articles. Depth of penetration, as measured by infra red analysis, as much as 10 mils has been found. The weight pick-up or increase of the treated polyethylene articles is about 2 to 25%. The scratch resistance of the treated articles, as hereinafter defined, is from about 3 to 10 grams. Also noteworthy is the fact that articles treated in accordance with the present invention remained undiscolored for at least 2 years when kept at ordinary room temperature.

While the invention is exemplified in a preferred embodiment by illustrating its application to polyethylene articles, it is applicable to thermoplastic articles in general. Among such thermoplastics which may be mentioned are vinyl chloride-vinyl acetate copolymer, polystyrene and the copolymer of vinyl chloride and acrylonitrile.

Organotrihalosilanes, individually or in admixture or in combination with diorganodihalosilanes and/or triorganohalosilanes, can be used in accordance with our invention. Where organotrihalosilanes are used in combination with diorganodihalosilanes and/or triorganohalosilanes, such mixtures should have an average functionality greater than 2; i.e., they should contain an average of more than 2X groups per silicon atom.

The organotrihalosilanes employed herein can be represented by the formula $$RSiX_3$$

wherein X may be chlorine or bromine and the organo group, R, may be a saturated or unsaturated aliphatic, alicyclic or aromatic hydrocarbon, or a mono- or polychlorinated hydrocarbon radical such as methyl, ethyl, $\gamma$-chloropropyl, amyl, cyclohexyl, cyclohexenyl, bicyclopentenyl, vinyl, chlorovinyl, phenyl, tolyl, benzyl, $\beta$-phenylethyl, chlorophenyl, dichlorophenyl, and the like.

The diorganodihalosilanes can be represented by the formula, $R_2SiX_2$; the triorganohalosilanes can be represented by the formula, $R_3SiX$, wherein R and X are as defined in the preceding paragraph. Examples of such silanes include diphenyldichlorosilane, diethyldichlorosilane, trimethylchlorosilane, bis-(chlorophenyl) dichlorosilane, tris-(chlorophenyl)chlorosilane, and the like.

In general, as aforesaid, the process of the present invention is conducted by first contacting the thermoplastic articles to be treated with the aforementioned organohalosilanes at an elevated temperature. The articles may be immersed directly into the liquid organohalosilanes or the articles may be exposed to the vapors of these silanes. The temperatures employed will vary in accordance with the materials employed and the results desired, but in any case a temperature of not less than about 60° C. and not high enough to cause distortion of the articles is used, temperatures between about 80° C. and about 90° C. giving excellent results as a rule. In this connection, therefore, temperatures below the softening point of the thermoplastic articles and desirably not more than about 20° C. below the softening point are used. The foregoing contact period is determined by the amount of opacity and penetration desired and by the materials employed, as will be understood by those skilled in the art. In this connection, it has been found that immersion in liquid requires contact periods about one-half as long as corresponding treatments involving contact with vapors.

In actual practice, it has been found that a useful criterion for determining the period of contact is to ascertain by test the time required to impart an opacity to the article to be treated equivalent to that imparted to a 125 mil thick compression molded polyethylene section exposed to vinyltrichlorosilane vapors, preferably, however, to vinyltrihalosilane liquid, for 2 minutes at 90° C., as the lower limit of contact followed by a controlled slow hydrolysis as aforesaid. Contact periods in excess of those determined in accordance with the foregoing may be used, if desired, provided that such periods are shorter than those which will cause undue surface embrittlement of the treated articles. By way of illustration, it has been found that suitable contact periods are from about 5 to about 20 minutes when treating polyethylene articles at 90° C., contact periods of more than 60 minutes under such conditions being contra-indicated as adverse surface effects are obtained with such extended treatments.

Following the foregoing contact treatment, the thermoplastic articles are subjected to a slow hydrolysis of the silane under controlled conditions in moisture-containing air or liquid, desirably at room temperature, i.e., around 20°–25° C. It is essential that the rate of hydrolysis be slow in order to avoid adverse effects such as a discontinuous coating. In view of the fact that the rate of hydrolysis depends on various factors, including the moisture content of the air or liquid used, the ratio of the surface area to volume of the article being treated, the particular thermoplastic article and silane, and the conditions employed, it is not possible to give detailed instructions applicable to all conditions. As illustrative, it is noted that in treating synthetic thermoplastic fibers, fabrics and other articles possessing a relatively great surface area per unit volume, a short period, for example, about 1 minute is sufficient. On the other hand, in treating materials such as compression molded polyethylene a 5 minute period has been found to be the minimum required.

The relative humidity of the air is of great importance. Hydrolysis proceeds at an undesirably rapid rate where the moisture content is 80% or higher at room temperature. Air with relative humidity up to 80% can be used, air having a relative humidity between about 20% and about 70% being advantageous. It will be understood that the period required for hydrolysis will vary according to the relative humidity, shorter periods being called for with air of high relative humidity, and vice versa.

Following the aforementioned controlled slow hydrolysis, the treated article may, if desired, be immersed in water at around room temperature for a period of about 10 minutes or longer.

The treated article, after the controlled slow hydrolysis or, if used, the just-mentioned water immersion step, is cured by heating it in air. In general, this air treatment is carried out at 60°–100° C. The time of this treatment will vary in accordance with the temperature and article employed. In general, a 30 minute treatment is sufficient at the higher temperature and about 4 hours is required at 60° C.

Following the aforementioned air cure step, the treated articles are washed with water at an elevated temperature in order to remove all or substantially all of the ionic impurities, e.g., HCl in the case vinyltrichlorosilane is used. This wash step may, if desired, be combined with the aforementioned optional water immersion step, but it is preferred to perform it separately as described. The temperature employed in this ion removal step is elevated in order to effect more rapid removal of the ionic impurities. Temperatures within the range of about 40° C. to about 70° C. have been found to give desirable results when treating polyethylene and other articles, temperatures above about 70° C. not being recommended as they adversely affect the nature of the surface of the treated articles.

If desired, the treated article following the foregoing hot water wash may be treated with an alkaline material. For example, a wash for about 15 minutes in hot (50°–60° C.) 10% by weight aqueous sodium hydroxide solution, followed by a wash for about 15 minutes with hot (50°–60° C.) water can be used. The final wash water should be substantially free of ionic impurities.

Illustrating the uses to which articles treated in accordance with the present invention may be put, we note, for example, that treated polyethylene-covered golf balls are scuff-resistant and cut-resistant; that treated molded or blown articles of polyethylene, such as cosmetic containers, are stain-resistant; and that treated polyethylene electrical insulation is heat-resistant.

The invention is further illustrated in the following examples, the parts being by weight.

*Example I*

A compression molded polyethylene sheet of 125 mil thickness was immersed for 5 minutes in vinyltrichlorosilane heated to 90° C. The treated material was then allowed to remain for 10 minutes in air of 25% relative humidity at room temperature (25°–30° C.), then immersed for about 10 minutes in water at room temperature, then heated in air for 30 minutes at 90°–100° C., and finally washed for 40 minutes with water heated to 50°–60° C.

The weight increase or pick-up was 5.5%. The resulting sheet was tested for its scratch resistance by an apparatus consisting of a balanced arm with a phonograph needle serving as a cutting stylus at one end. It was found that the scratch resistance was 7 grams as against ½ gram for the same article prior to treatment.

Further, the article treated in accordance with this example was frosty and opaque and exhibited freedom from staining, i.e., no discoloration, after having been immersed in tomato juice at 90° C. for 15 minutes, followed by a wash with hot soapy water. The untreated article showed discoloration under the same conditions.

There was no distortion shown by the treated article when heated for 1 hour at 150° C. or for 15 minutes at 200° C. The untreated article completely distorted under the same conditions.

*Example II*

A compression molded polyethylene sheet of 125 mil thickness was treated as described in Example I but using ethyltrichlorosilane. The weight pick up was 8.10%. The resulting treated sheet was frosty and opaque, had a scratch resistance of 8 grams, showed no discoloration in the aforementioned juice test, and it did not distort when heated either for 1 hour at 150° C. or for 15 minutes at 200° C.

*Example III*

A 4 oz., 45 mil thickness, blow molded, polyethylene bottle was immersed for 5 minutes in ethyltrichlorosilane at 85° C. The bottle was then allowed to stand in air of 30% relative humidity for 5 minutes at room temperature and then immersed in room temperature water for 15 minutes. It was then cured in an oven at 90°–100° C. for 30 minutes. Finally, the cured bottle was immersed for 40 minutes in hot (50°–60° C.) water. The weight pick up was 10.0%. The treated bottle was frosty and opaque, and when heated for 30 minutes at 130° C. did not distort and the surface of the bottle remained smooth and even, whereas the untreated bottle completely collapsed under these test conditions.

*Example IV*

A 30 mil thick sheet of polyethylene was prewarmed to 80° C. and then immersed in a solution of 90% vinyltrichlorosilane, 8% toluene, and 2% benzoyl peroxide for 5 minutes at 80° C. The article was then allowed to stand in air of 30% relative humidity at room temperature for 5 minutes, followed by immersion in water at 23° C. for 15 minutes. It was then cured by heating in air at 90°–100° C. for 20 minutes followed by a hot water (50°–60° C.) wash for 40 minutes.

The treated product had a scratch resistance of 10 grams as compared to 6 grams for a treatment without catalyst. The treated product of this example was frosty and opaque and possessed substantially the same properties as those of the products made in accordance with the other examples.

Example V

The procedure of Example I was repeated except for the 40 minute hot water wash. The article obtained after the 30 minute treatment in air at 90°–100° C. was washed for 10 minutes with water heated to 50°–60° C. and then washed with a 10% aqueous sodium hydroxide solution at the same temperature for about 15 minutes, and finally was washed in hot (50°–60° C.) water for about 10 minutes.

The resulting product had substantially the same properties as that obtained in accordance with Example I.

Example VI

A clear, 125 mil plaque compression molded from a 97/3 vinyl chloride/vinyl acetate copolymer composition plasticized with 30% (on overall composition) dioctyl phathalate was treated as follows: It was immersed in vinyltrichlorosilane for 5 minutes at 85° C.; suspended in air of 25% relative humidity at room temperature for 10 minutes; immersed in water at room temperature for 10 minutes; placed in an 80° C. oven for 30 minutes; then washed with warm (50°–70° C.) water until it was substantially free of ionic impurities, as reflected by the neutrality of the wash water to litmus paper. The treated plaque so prepared, which was opaque and showed a weight gain of 10%, sustained a 1 hour exposure at 125° C. with no discernible distortion and was opaque in appearance.

Example VII

A clear, transparent, compression molded, 125 mil thick polystyrene plaque was treated as follows: It was immersed in vinyltrichlorosilane liquid at 75°–80° C. for 2 minutes; placed in a low humidity chamber (less than 10/ humidity) for 10 minutes; suspended in air at room temperature for 10 minutes; immersed in room temperature water for 10 minutes; placed in 80° C. oven for 30 minutes; then washed with hot (50°–70° C.) water until the sample was substantially free of ionic impurities as reflected by the neutrality of the wash water to litmus paper. There was so obtained a white opaque plaque which showed silane penetration to a depth of 15 mil and which suffered no shrinkage or other dimensional distortion when immersed for 1 hour in boiling water.

The procedure described in the foregoing paragraph was repeated except that the immersion was in the vapors of vinyltrichlorosilane and was for 4 minutes, with substantially the same results being obtained.

Example VIII

A clear, woven synthetic fiber prepared from a copolymer containing approximately 60% vinyl chloride and 40% acrylonitrile was treated as follows: It was immersed in ethyltrichlorosilane at 85° C. for 2 minutes; suspended in air of 30% relative humidity at room temperature for 1 minute; immersed in successive portions of hot water (40°–50° C.) until said water had washed out all the ionic impurities as indicated by a neutral reaction to litmus paper; heated for 5 minutes at 90° C. and dried. The so-treated fabric was completely opaque, showed approximately 25% weight gain and improved heat resistance. The improved heat resistance was reflected by the lack of strinkage on ironing, i.e., with an iron set to the temperature usually used for linen. This represents an increase of about 25° C. in the so-called "maximum safe ironing temperature."

While this invention has been described in detail in its preferred embodiment, it will be obvious to those skilled in the art, after understanding the present invention, that various changes and modifications may be made therein without departing from the spirit or scope thereof. The appended claims are intended to cover all such modifications and changes.

What is claimed is:

1. The process for rendering thermoplastic resinous articles heat-resistant, stain resistant and scratch-resistant, which comprises contacting said articles with at least one member selected from the group consisting of organotrihalosilane, a mixture of organotrihalosilane and diorganodihalosilane, a mixture of organotrihalosilane and triorganohalosilane, and a mixture of organotrihalosilane, diorganodihalosilane and triorganohalosilane, halogen being selected from chlorine and bromine, the average halogen functionality in any of said mixtures being greater than 2, for a predetermined period, and subjecting said treated articles to conditions causing the controlled slow hydrolysis of said member, said predetermined period being such that said member has penetrated into said articles to a depth of at least about 3 mils below the surfaces thereof.

2. The process of claim 1, wherein the thermoplastic article is polyethylene and said member is vinyltrichlorosilane.

3. The process of claim 1, wherein the thermoplastic article is polyethylene and said member is ethyltrichlorosilane.

4. The process of claim 1, wherein said member has penetrated into said articles to a depth from about 3 to about 10 mils below the surfaces thereof.

5. The process of claim 4, wherein the thermoplastic article is polyethylene and said member is ethyltrichlorosilane.

6. The process of claim 4, wherein the thermoplastic article is polyethylene and said member is vinyltrichlorosilane.

7. The process of claim 6, wherein said hydrolysis is conducted in the presence of air having a relative humidity of up to about 80% for a period of not less than about 5 minutes at a temperature of about 25° C.

8. The process of claim 6, wherein said contacting is conducted at a temperature not more than about 20° C. below the softening point of the article being treated.

9. The process of claim 8, wherein said hydrolysis is conducted in the presence of air having a relative humidity of up to about 80% for a period of not less than about 5 minutes at a temperature of about 25° C.

10. The process of rendering polyethylene articles heat-resistant, stain-resistant and scratch-resistant, which comprises contacting a polyethylene article with vinyltrichlorosilane liquid at about 80°–90° C. for about 5 to 15 minutes, allowing the thus-treated article to remain in air of relative humidity up to about 80% at about 25° C. in order to effect a controlled slow hydrolysis of said silane, curing the resulting article in air at about 60°–100° C., and removing ionic impurities from the resulting article, the final product being characterized by opacity and by pentration of the silane to a depth of at least 3 mils.

11. The process of rendering polyethylene articles heat-resistant, stain-resistant, and scratch-resistant, which comprises contacting a polyethylene article with ethyltrichlorosilane liquid at about 80°–90° C. for about 5 to 15 minutes, allowing the thus-treated article to remain in air of relative humidity up to about 80% at about 25° C. in order to effect a controlled slow hydrolysis of said silane, curing the resulting article in air at about 60–100° C., and removing ionic impurities from the resulting article, the final product being characterized by opacity and by penetration of the silane to a depth of at least 3 mils.

12. Heat-resistant, stain-resistant, scratch-resistant, opaque thermoplastic resinous articles containing an hydrolytic product of at least one member selected from the group consisting of organotrihalosilane, a mixture of organotrihalosilane and diorganodihalosilane, a mixture of organotrihalosilane and triorganohalosilane, and a mixture of organotrihalosilane, diorganodihalosilane and triorganohalosilane, halogen being selected from chlorine and bromine, the average halogen functionality in any of said mixtures being greater than 2, said hydrolytic product being present to a depth of at least 3 mils below the surfaces of said articles.

13. Articles in accordance with claim 12, wherein said thermoplastic article is polyethylene and said member is vinyltrichlorosilane.

14. Articles in accordance with claim 13, wherein said hydrolytic product is present to a depth from about 3 to about 10 mils below the surfaces of said articles.

15. Articles in accordance with claim 12, wherein said thermoplastic article is polyethylene and said member is ethyltrichlorosilane.

16. Articles in accordance with claim 14, wherein said hydrolytic product is present to a depth from about 3 to about 10 mils below the surfaces of said articles.

References Cited in the file of this patent

UNITED STATES PATENTS

| | | |
|---|---|---|
| 2,471,224 | Loughborough | May 24, 1949 |
| 2,507,414 | MacKenzie | May 9, 1950 |
| 2,567,804 | Davies | Sept. 11, 1951 |
| 2,785,085 | Sayre | Mar. 12, 1957 |

UNITED STATES PATENT OFFICE

CERTIFICATE OF CORRECTION

Patent No. 2,921,870                          January 19, 1960

Bernard Baum et al.

It is hereby certified that error appears in the printed specification of the above numbered patent requiring correction and that the said Letters Patent should read as corrected below.

Column 5, line 41, for "10/ humidity)" read -- 10% humidity) --; column 8, line 3, for the claim reference numeral "14" read -- 15 --.

Signed and sealed this 28th day of June 1960.

(SEAL)
Attest:
KARL H. AXLINE
Attesting Officer

ROBERT C. WATSON
Commissioner of Patents